United States Patent [19]

Araya

[11] Patent Number: 4,888,309

[45] Date of Patent: Dec. 19, 1989

[54] HYDROPHOBIC, HIGHLY POROUS, THREE-DIMENSIONAL INORGANIC STRUCTURES

[75] Inventor: Abraham Araya, Bebington, England

[73] Assignee: Unilever Patent Holdings BV, Rotterdam, Netherlands

[21] Appl. No.: 109,179

[22] Filed: Oct. 16, 1987

[30] Foreign Application Priority Data

Oct. 16, 1986 [GB] United Kingdom ............... 8624872

[51] Int. Cl.$^4$ .............................................. C04B 38/00
[52] U.S. Cl. ...................................... 501/80; 423/85; 423/118; 423/122; 423/338; 264/42
[58] Field of Search ............... 501/1, 80; 423/85, 118, 423/122, 338; 264/42

[56] References Cited

U.S. PATENT DOCUMENTS

| | | | |
|---|---|---|---|
| 3,301,635 | 1/1967 | Bergna et al. | 423/335 |
| 3,857,924 | 12/1974 | Halasz et al. | 423/338 |
| 3,892,580 | 7/1975 | Messing | 501/80 |
| 4,011,096 | 3/1977 | Sandell | 423/338 |
| 4,089,932 | 5/1978 | Maira et al. | 423/338 |
| 4,190,457 | 2/1980 | McDaniel | 423/338 |
| 4,448,914 | 5/1984 | Drinkuth et al. | 501/80 |
| 4,654,314 | 3/1987 | Takagi et al. | 501/80 |

FOREIGN PATENT DOCUMENTS 0200528 11/1986 European Pat. Off. .
0264268 4/1988 European Pat. Off. .

OTHER PUBLICATIONS

European Search Report (EP 87 30 9066).

Primary Examiner—Mark L. Bell
Assistant Examiner—David M. Brunsman
Attorney, Agent, or Firm—Cushman, Darby & Cushman

[57] ABSTRACT

Three dimensional hydrophobic substantially inorganic porous structure comprises a myriad of cavities interconnected by holes in which the diameters of the cavities are in the range of from 0.5 to 100 μm and the diameters of the holes are in the range of from 0.1 to 20 μm the porosity of the structure having a narrow pore size distribution with the cavities having a pore volume of at least 2 cc/g for a predetermined 10 μm range of sizes. The structure is preferably an inorganic oxide selected from the group comprising alumina, silica, titania, zirconia and mixtures thereof. The structure is preferably made from an oil-in-water emulsion with a silylating agent in the internal phase so as to render the structure hydrophobic.

14 Claims, 2 Drawing Sheets

HYDROPHOBIC, HIGHLY POROUS, THREE-DIMENSIONAL INORGANIC STRUCTURES

This invention relates to a new hydrophobic, highly porous, three-dimensional, inorganic structure having a myriad of cavities interconnected by holes.

In co-pending European Patent Application No. 200528 novel highly porous, three-dimensional, inorganic structures are described which do not have the hydrophobic character of those provided by the present invention. In addition, in that co-pending application the process for the manufacture of such structures is disclosed. The contents of EP-A No. 200528 are hereby incorporated into the present specification by reference.

According to a first aspect of the present invention there is provided a three dimensional hydrophobic substantially inorganic porous structure comprising a myriad of cavities interconnected by holes in which the diameters of cavities are in the range of from 0.5 to 100 $\mu$m and the diameters of the holes are in the range of from 0.1 to 20 $\mu$m, the porosity of the structure having a narrow pore size distribution with the cavities having a pore volume of at least 2 cc/g for a predetermined 10 $\mu$m range of sizes.

Preferably the diameters of the cavities are in the range of from to 0.5 to 50 $\mu$m, the diameters of the holes are in the range of from 0.5 to 10 $\mu$m and the cavities have a pore volume of at least 2 cc/g for cavities having diameter within the range 0.5 to 10 $\mu$m. More preferably the diameters of the cavities are in the range of from 1 to 50 $\mu$m, the diameters of the holes are in the range of from 1 to 10 $\mu$m and the cavities have a pore volume of at least 2 cc/g for cavities having diameters within the range 1 to 10 $\mu$m.

The provision of hydrophobic inorganic porous structures having a narrow pore size distribution can allow their employment in specific end users. The proportion of cavities having a pore volume in the predetermined range of sizes can amount to at least 90% v/v with respect to the sum total of the cavity pore volume present. The cavities can for example have a pore volume of up to 8 cc/g for the said predetermined range of pore sizes. Porosity of the structures can be measured by mercury porosimetry.

The inorganic material comprising the structure can be selected from the group comprising alumina, silica, titania, zirconia and mixtures thereof.

The structure is preferably rendered hydrophobic by the use of a silylating agent. Suitably the silylating agent replaces the equivalent of at least 5 molar percent available hydroxy groups in the inorganic structure. An upper limit to the level of silylating agent may be determined by the make-up at the structure, but can be the equivalent of up to 40 molar per cent available hydroxy group in the inorganic structure.

Any silylating agent employed is suitably selected from the group comprising siloxanes, silazanes, oxysilanes, alkylhalosilanes, arylhalosilanes, alkyhalo-oxysilanes, arylhalo-oxysilanes, substituted derivatives and mixtures thereof. The silylating agent selected and its amount will depend on the system required and the degree of hydrophobicity desired. The present structures can however have a carbon content within the range 0.5 to 10% by weight with respect to the total weight of the structure. The actual proportion of carbon present will depend not only on the molar proportion of silylating groups present, but also their carbon chain length.

According to a second aspect the present invention there is provided a process for preparing a three-dimensional hydrophobic substantially inorganic structure according to the first aspect of the present invention, the process comprising:

(a) forming an oil-in-water emulsion having an oil phase by volume greater than 50% by contacting in the presence of an appropriate emulsifying agent an aqueous solution of a precursor of the inorganic structure with a water immiscible fluid comprising the oil phase; and (b) gelling the continuous aqueous phase of the emulsion by the addition of a gelling agent or by allowing the emulsified inorganic sol to set with time;

wherein the aqueous solution of the precursor of the inorganic structure and/or the gelled or set emulsion is contacted with an effective amount of a reactive silylating agent.

Suitably the inorganic structure is an inorganic oxide selected from alumina, silica, titania, zirconia and mixtures thereof. The amount of silylating agent employed is preferably effective to replace the equivalent of at least 5 molar percent available hydroxy groups and up to the equivalent of 40 molar percent available hydroxy groups.

Preferably the aqueous solution of the precursors of the inorganic structure is contacted with an effective amount of a reactive silylating agent. The precursors are for example appropriate inorganic salts and lower oxides suitable for forming the desired inorganic structure. Contact between the precursors and the silylating agent thus occurs prior to causing the emulsion to set or gel. Contact with the silylating agent in such a manner can for a given structure lead to a higher degree of silylating agent being incorporated than contacting the ready formed structure with a silylating agent. Preferably therefore the "oil" phase in the emulsion, by which is meant a water-immiscible fluid, consists at least partially of the silylating agent employed. If desired the silylating agent can constitute the entirety of the "oil" phase or it can be diluted by use of or dissolved in an appropriate water-immiscible solvent, for example cyclohexane. The silylating agent can thus be solid or liquid. The ratio of silylating agent to solvent employed will depend on both the degree of hydrophobicity and the overall porosity of the structure required. The amount of silylating agent is preferably between 2 and 50% by weight with respect to the weight of the emulsion.

By the present process porous inorganic structures can be provided which are hydrophobic both on the exterior surface and on the internal cavities and pores, providing sufficient silylating agent is employed.

Suitable reactive silylating agents for use in the present process are essentially those which are not hydrolysed or otherwise deactivated in the process. Likewise, the silylating agents should not, under the conditions of the process, trigger premature gelation of the inorganic material.

Preferably the reactive silylating agent is selected from the group comprising siloxanes, silazanes, oxysilanes, alkylhalosilates, arylhalosilanes and alkylhalo-oxysilanes, arylhalo-oxysilanes, substituted derivatives and mixtures thereof.

Examples of suitable silanes include:

R—Si—O—Si—R and R—Si—NH—Si—R where R is —CH$_3$ or —C$_2$H$_5$; and

R'—Si—X$_m$ where R' is —C$_n$H$_{2n+1}$, is 1 to 22) or —C$_6$H$_5$, m is 1 to 3 and —X is —Cl, —Br, —I, —OMe, —OEt.

In a preferred form of the process the water-immiscible fluid, together with any unreacted silylating agent is removed from the structure and, optionally, any electrolytes can be washed out and the structure dried.

The choice of the water-immiscible fluid together with the reactive silane used in the process of this invention will be a factor in deciding on an appropriate emulsifying agent and suitable information can be obtained from a textbook such as "Surface Active Agents", Schwartz M A, & Perry W J, Interscience Publishers, New York, 1974). The essential requirement is that a relatively stable oil-in-water emulsion is produced and the production of this emulsion will be facilitated by a suitable emulsification apparatus including slow or high speed stirrer or vibration mixture.

The following examples will indicate the procedure for carrying out the invention and illustrate the general method of preparation. The embodiments of the invention so described are however by way of example only.
In the accompanying drawings.

The words "Miranol" and "Crodateric" are trade names and refer to imidazoline-based amphoteric emulsifying agents. "Merpol" is a trade name and refers to a series of surface-active agents used as dyeing assistants.

EXAMPLE 1

53 mls of neutral silicate (SiO$_2$:Na$_2$O=3.28 and 28.3% SiO$_2$) was diluted with 47 mls of water to give silicate solution containing 15% SiO$_2$ by weight. 44 g of the diluted silicate solution was premixed with 0.4 g Miranol and 0.4 g of Crodateric C in 250 ml plastic beaker. 134 mls of cyclohexane and 10 ml hexamethyl disiloxane (HMDS) were added to the silicate-emulsifying agent mixture and stirred using a vibro mixer for five minutes. The emulsified silicate was gelled by dropping into 5N sulphuric acid using a plastic dropping pipette. The gel was left in the acid for eighteen hours at room temperature, then separated from the acid and rinsed with water to remove any adhering acid solution. The wet product was first air dried and then washed repeatedly with water and dried at 110° C. for 16 hours.

Examination of the dried product by scanning electron microscopy revealed a three-dimensional network structure with cavities having interconnecting holes. The pore volume of the dried product between 1 to 10 $\mu$m as determined by mercury porosimetry was 4.5 cc/g and the carbon content as measured by carbon sulphur analyser (LECO CS-244) was 2.1%.

0.05 g of 106–250 $\mu$particle size of the dried product was placed on the surface of 15 mls water in 100 ml beaker. Methanol was titrated onto the sample in small amounts. The beaker was shaken between additions of methanol. 28 mls of methanol were required for all the sample to be completely wetted and descend to the bottom of the beaker. A sample with similar particle size but made without the addition of any HMDS in the dispersed phase required less than 1 ml methanol to be completely wetted and sent to the bottom of the beaker.

EXAMPLE 2

The procedure of Example 1 was repeated except that 11 mls of cyclohexane and 30 mls of HMDS were used.

Figure 2:
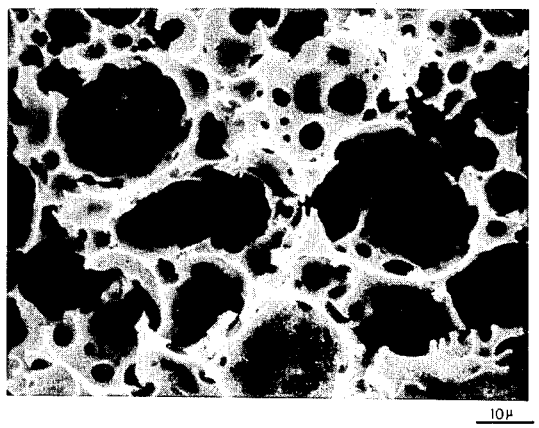
FIGS. 2 and 3 are scanning electron micrographs of the products of Examples 2 and 5.

The dried product had a pore volume of 4.4 cc/g between 1 to 10$\mu$m and a carbon content of 2.7%. SEM of the product showed a three-dimensional network structure with cavities interconnected by holes as shown in FIG. 2 of the accompanying drawings.

EXAMPLE 3

The procedure of Example 1 was repeated excepted that 72 mls of cyclohexane and 72 mls of HMDS were used.

The pore volume of the dried product between 1 to 10$\mu$m was 4.3 cc/g and the carbon content was 6.5%. 36 mls of methanol was required to wet and sink completely 0.05 g of 106–250$\mu$ particle size of the product to the bottom of a beaker containing 15 mls of water. Scanning electron microscopy (SEM) of the product showed a three-dimensional network structure with cavities interconnected by holes.

Figure 1:
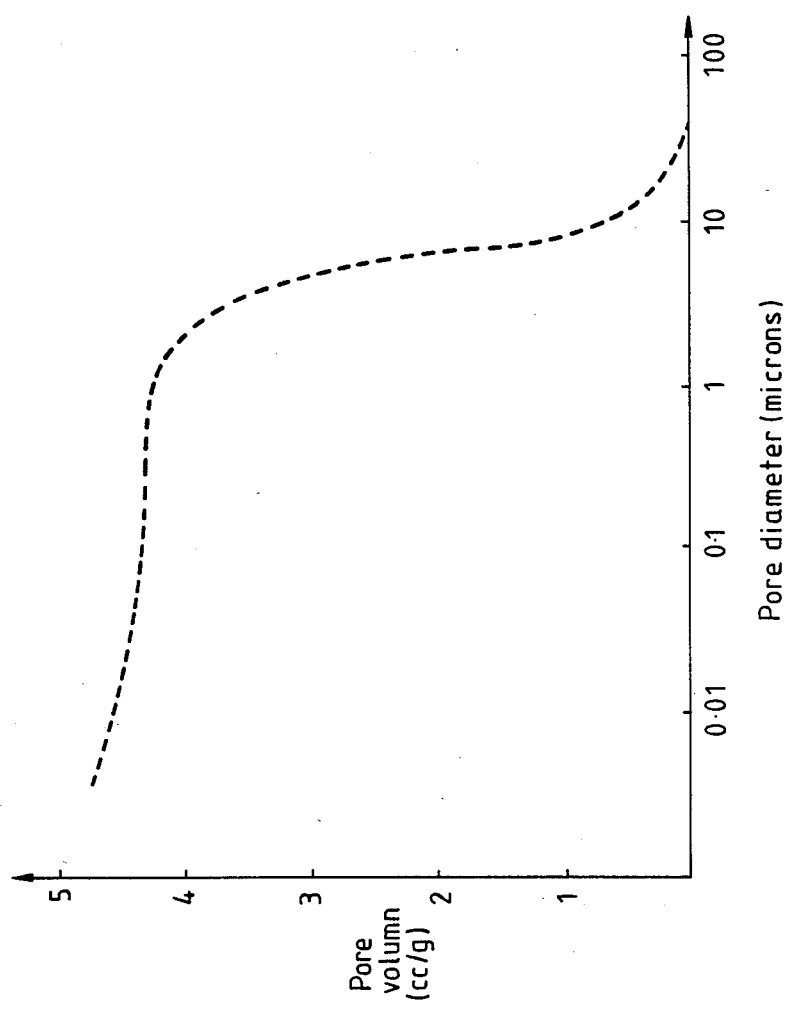
FIG. 1 is a porosity trace of the product of Example 3.

FIG. 1 is a porosity trace of the product of Example 3 which is a graph of cumulative pore volume in cc/g on the ordinate and pore diameter in log scale in microns on the abscicca.

EXAMPLE 4

The procedure of Example 1 was repeated except that 36 mls of cyclohexane and 108 mls of HMDS were used.

The dried product had a pore volume of 4 cc/g between 1 to 10 $\mu$m and a carbon content of 9.1%. SEM of the product showed a three-dimensional network structure with cavities interconnected by holes.

EXAMPLE 5

The procedure of Example 1 was repeated except that 144 mls of HMDS was used.

Figure 3:
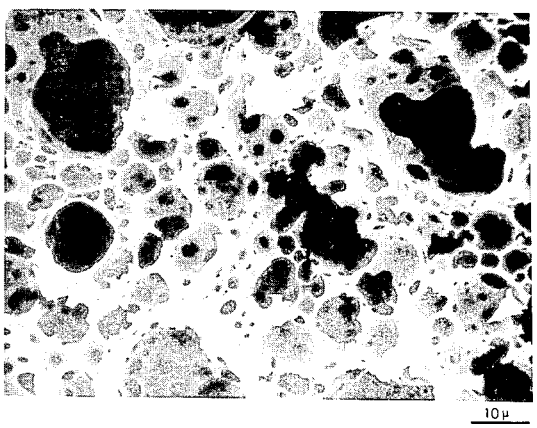

The dried product had a pore volume of 3.7 cc/g between 1 to 10 $\mu$m and a carbon content of 9.8%. SEM of the product showed a three-dimensional network structure with cavities interconnected by holes as shown in FIG. 3 of the accompanying drawings.

EXAMPLE 6

160 g of an aqueous solution of sodium silicate containing 20% by weight SiO$_2$ was mixed with 1.6 g Miranol and 1.3 g Crodateric C in a 400 ml plastic beaker. 311mls of cyclohexane were added to the silicate/emulsifying agent mixture followed by 55 mls HMDS. The mixture was stirred using a vibro mixer for 25 minutes. The resulting emulsion was then treated in the same manner as described for Example 1.

The pore volume of the dried product was 3.4 cc/g between 1 and 10 $\mu$m. The product had an overall porosity of 4.93 cc/g and contained 13.6wt % carbon.

EXAMPLE 7

The procedure of Example 6 was followed employing 63 g sodium silicate solution (20% SiO$_2$), 0.6 g Miranol, 0.52 g Crodateric C, 141 mls cyclohexane and 3 mls HMDS.

The product had an overall porosity of 5.78 cc/g and a porosity between 0.5 and 5 μm of 5.23 cc/g. The carbon content of the product was 1.6 wt. %.

EXAMPLE 8

The procedure of Example 6 was followed employing 63 g of aqueous solution of sodium silicate (20% SiO₂), 0.63 g Miranol, 0.52 g Crodateric C, 138 mls cyclohexane and 6 mls HMDS.

The product had an overall porosity of 5.28 cc/g and a porosity between 0.5 and 5 μm of 3.3 cc/g and a carbon content of 2.65 wt. %.

EXAMPLE 9

The procedure of Example 6 was followed employing 160 g aqueous sodium silicate solution (containing 20% by weight SiO₂), 1.6 g Miranol, 1.3 g Crodateric C, 348 mls cyclohexane and 18 mls HMDS.

The product had an overall porosity of 5.19 cc/g and a porosity between 0.5 and 5 μm of 3 cc/g. The product contained 8.08 wt % carbon.

EXAMPLE 10

6.7 g of a porous silica structure prepared according to the process described in EP-A No. 200528 was weighed into a 2 liter plastic beaker. The structure had a pore volume between 1 and 10 μm of 4.2 cc/g. 144 mls HMDS were added and then 1 liter 5N sulphuric acid. The contents of the beaker were stirred for 24 hours. The product was separated from the acid and washed and dried as described in Example 1.

The product had an overall porosity of 6.08 cc/g and a pore volume between 1 and 10 μm of 3.9 cc/g. The product contained 6.7 wt % carbon.

EXAMPLE 11

44 g of sodium aluminosilicate sol (prepared by mixing 53 g acid alum [2.76% Al₂O₃, 20% H₂SO₄ and 77.24% H₂O] and 165 g sodium silicate [10.4% SiO₂ by weight]) was premixed with 0.3 g Merpol in a 250 ml plastic beaker. 130 mls cyclohexane were added to the aluminosilicate/ emulsifying agent mixture followed by 14 mls HMDS. The mixture was stirred using a vibro mixer for 10 minutes and the resulting emulsion was left to stand for 15 minutes. The emulsion was gelled by dropping into 1M ammonium carbonate using a plastic dropping pipette. The gel was left in the ammonium carbonate for 2 hours, then separated off and rinsed, air-dried, washed and oven-dried in the manner described for Example 1.

The overall porosity of the product was 4.16 cc/g and the pore volume between 0.5 and 10 μm was 2.2 cc/g.

The product contained 1.7wt % carbon.

EXAMPLE 12

15 mls of Ti(SO₄)₂ solution (15% w/v in H ) were added to 30 mls of 12% silica sol in a 250 ml plastic beaker. 0.3 g of Merpol were mixed in and 130 mls cyclohexane added followed by 14 mls HMDS. The mixture was stirred for 10 minutes using a vibro mixer and the resulting emulsion was left to stand for 15 minutes. The emulsion was gelled by dropping into a 25% ammonia solution. After standing for 10 minutes the gel was separated and then air-dried. The product was washed and dried as described in Example 1.

The overall porosity of the product was 3.18 cc/g and the pore volume between 1 and 10 μm was 2.0 cc/g.

The product contained 2.8 wt % carbon.

I claim:

1. Three dimensional hydrophobic substantially inorganic porous structure having a void space in the form of a three-dimensional network of a myriad of cavities separated from each other by thin walls of inorganic material and interconnect by holes through said walls in which the diameters of the cavities are in the range of from 0.5 to 100 μm and the diameters of the holes are in the range of from 0.1 to 20 μm, the porosity of the structure having a narrow pore size distribution with the cavities having a pore volume of at least 2 cc/g for a 10 μm range of sizes, said inorganic material being selected from the group consisting of silicates, alumina, silica, titania, zirconia and mixture thereof and having been silylated by a silylating agent to render it hydrophobic.

2. Structure according to claim 1 wherein the diameters of the cavities are in the range of from 0.5 to 50 μm, the diameters of the holes are in the range of from 0.5 to 10 μm and the cavities have a pore volume of at least 2 cc/g for cavities having diameters within the range 0.5 to 10 μm.

3. Structure according to claim 2 wherein the diameters of the cavities are in the range of from 1 to 50 μm, the diameters of the holes are in the range of from 1 to 10 μm and the cavities have a pore volume of at least 2 cc/g for cavities having diameters within the range 1 to 10 μm.

4. Structure according to any one of the preceding claims wherein the cavities have a pore volume of up to 8 cc/g for the said predetermined range of pore sizes.

5. Structure according to claim 1 wherein a silylating agent has replaced the equivalent of up to 40 molar percent available hydroxy groups in the inorganic structure.

6. Structure according to claim 1 wherein the silylating agent is selected from the group comprising siloxanes, silazanes, oxysilanes, alkylhalosilanes, arylhalosilanes, arylhalo-oxysilanes, alkylhalo-oxysilanes, substituted derivatives and mixtures thereof.

7. Structure according to claim 1 wherein the structure has a carbon content within the range 0.5 to 10% by weight with respect to the total weight of the structure.

8. Process for preparing a three-dimensional, hydrophobic substantially inorganic porous structure having a void space in the form of a three-dimensional network of a myriad of cavities separated from each other by thin walls of inorganic material and interconnected by holes through said walls in which the diameters of the cavities are in the range of from 0.5 to 100 μm, and the diameters of the holes are in the range of from 0.1 to 20 μm, the porosity of the structure having a narrow pore size distribution with the cavities having a pore volume of at least 2 cc/g for a 10 μm range of sizes, said inorganic material being selected from the group consisting of silicates, alumina, silica, titania, zirconia and mixtures thereof and having been silylated by a silylating agent to render it hydrophobic, the process comprising:

(a) forming an oil-in-water emulsion having an oil phase by volume greater than 50% by contacting in the presence of an appropriate emulsifying agent an aqueous solution or sol of a precursor of the inorganic structure with a water immiscible fluid comprising the oil phase;

(b) including in the emulsion a reactive silylating agent suitable for silylating the inorganic material;

(c) gelling the continuous aqueous phase of the emulsion by the addition of a gelling agent or by allowing the emulsified inorganic sol to set with time;

wherein the aqueous solution of the precursor of the inorganic structure and/or the gelled or set emulsion is contacted with an effective amount of a refractive silylating agent.

9. Process according to claim 8 wherein the amount of silylating agent employed is effective to replace the equivalent of at least 5 molar percent available hydroxy groups and up to the equivalent of 40 molar per cent available hydroxy groups.

10. Process according to claim 8 wherein the water-immiscible fluid in the emulsion comprises the reactive silylating agent.

11. Process according to claim 8 wherein the reactive silylating agent is selected from the group comprising siloxanes, silazanes, oxysilanes, alkylhalosilanes, arylhalosilanes, alkylhalo-oxysilanes, arylhalo-oxysilanes, substituted derivatives and mixtures thereof.

12. Process according to claim 11 wherein the silylating agent is selected from the group comprising R—Si—O—Si—R and R—Si—NH—Si—R, wherein R is —CH$_3$ or —C$_2$H$_5$, and R'—Si—X$_m$ where R' is C$_n$H$_{2n+1}$ (n=1 to 22) or —C$_6$H$_5$ and —X is Cl, Br, I, OMe, OEt and m is 1 to 3.

13. Process according to any one of claim 8 including removing any unreacted silylating agent from the structure and drying the structure.

14. Process according to claim 8 wherein the silylating agent is employed in an amount between 2 and 50% by weight with respect to the weight of the emulsion.

* * * * *